(12) United States Patent
Fukuba et al.

(10) Patent No.: US 12,366,359 B2
(45) Date of Patent: Jul. 22, 2025

(54) COMBUSTOR AND GAS TURBINE

(71) Applicant: MITSUBISHI HEAVY INDUSTRIES, LTD., Tokyo (JP)

(72) Inventors: Shinichi Fukuba, Tokyo (JP); Zhi Zhang, Tokyo (JP); Keisuke Miura, Tokyo (JP); Tomo Kawakami, Tokyo (JP); Kiyoshi Fujimoto, Tokyo (JP); Taku Egawa, Tokyo (JP); Kenta Taniguchi, Tokyo (JP); Keijiro Saito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/850,333

(22) PCT Filed: Feb. 17, 2023

(86) PCT No.: PCT/JP2023/005867
§ 371 (c)(1),
(2) Date: Sep. 24, 2024

(87) PCT Pub. No.: WO2023/188984
PCT Pub. Date: Oct. 5, 2023

(65) Prior Publication Data
US 2025/0207781 A1 Jun. 26, 2025

(30) Foreign Application Priority Data
Mar. 30, 2022 (JP) .................. 2022-056000

(51) Int. Cl.
*F23R 3/28* (2006.01)
*F02C 7/22* (2006.01)

(52) U.S. Cl.
CPC ............... *F23R 3/286* (2013.01); *F02C 7/22* (2013.01); *F05D 2240/35* (2013.01)

(58) Field of Classification Search
CPC .... F23R 3/286; F23R 3/10; F23R 3/28; F23R 3/283; F23R 3/26; F23R 3/32; F23D 14/62; F23D 14/02; F23D 14/08
See application file for complete search history.

(56) References Cited

U.S. PATENT DOCUMENTS

| | | | |
|---|---|---|---|
| 4,100,733 A * | 7/1978 | Striebel | F23R 3/286 239/431 |
| 4,189,294 A * | 2/1980 | Rice | F23D 14/18 126/39 J |

(Continued)

FOREIGN PATENT DOCUMENTS

| | | |
|---|---|---|
| JP | 2008-175098 | 7/2008 |
| JP | 2013-139779 | 7/2013 |

(Continued)

OTHER PUBLICATIONS

International Search Report issued May 9, 2023 in International Application No. PCT/JP2023/005867, with English translation.

(Continued)

*Primary Examiner* — Craig Kim
(74) *Attorney, Agent, or Firm* — Wenderoth, Lind & Ponack, L.L.P.

(57) ABSTRACT

A combustor of the present disclosure includes a combustor plate configured to have a downstream end face perpendicular to a combustor axis; a nozzle segment configured such that a plurality of first nozzles that inject a premixed gas of air and fuel from a side of the downstream end face are collectively disposed; and a plurality of second nozzles configured to inject the fuel from the downstream end face. A plurality of the nozzles segments are provided at intervals in a direction perpendicular to the combustor axis. Each of the second nozzles injects the fuel from a dividing region between the nozzle segments on the downstream end face.

11 Claims, 9 Drawing Sheets

(56) References Cited

U.S. PATENT DOCUMENTS

| | | | | |
|---|---|---|---|---|
| 5,361,586 | A | * | 11/1994 | McWhirter ............. F23K 3/346 60/737 |
| 5,826,429 | A | * | 10/1998 | Beebe ..................... F23C 13/00 60/738 |
| 7,104,750 | B2 | * | 9/2006 | Bolis ......................... F02C 3/30 415/117 |
| 8,763,400 | B2 | * | 7/2014 | Bunker .................. F23R 3/286 60/740 |
| 8,806,871 | B2 | * | 8/2014 | McMasters ............... F23R 3/14 60/742 |
| 9,074,772 | B2 | * | 7/2015 | Miura ..................... F23R 3/286 |
| 9,599,335 | B2 | * | 3/2017 | Mine ........................ F23K 3/02 |
| 11,226,092 | B2 | * | 1/2022 | Abbasi ................... F23D 14/08 |
| 2003/0129056 | A1 | * | 7/2003 | Kuno ...................... F01D 5/145 415/208.2 |
| 2008/0134685 | A1 | * | 6/2008 | Bunker .................... F23R 3/20 60/776 |
| 2008/0187794 | A1 | * | 8/2008 | Weingaertner ...... B01F 25/3121 429/429 |
| 2010/0293956 | A1 | * | 11/2010 | Nadkarni ................ F23R 3/286 60/740 |
| 2011/0023494 | A1 | * | 2/2011 | Butler ....................... F23R 3/14 60/748 |
| 2013/0167539 | A1 | | 7/2013 | Berry |
| 2013/0232979 | A1 | * | 9/2013 | Singh ..................... F23R 3/286 60/737 |
| 2014/0116054 | A1 | | 5/2014 | Means et al. |
| 2017/0284671 | A1 | | 10/2017 | Asai et al. |
| 2018/0080647 | A1 | * | 3/2018 | Abbasi ................... F23L 15/00 |
| 2019/0093879 | A1 | * | 3/2019 | Pisani .................... F23D 14/02 |
| 2019/0368738 | A1 | * | 12/2019 | Rickey ............. B01F 25/31323 |
| 2021/0095599 | A1 | * | 4/2021 | Asai ......................... F02C 7/228 |
| 2021/0102703 | A1 | * | 4/2021 | Tada ......................... F02C 7/22 |
| 2021/0140324 | A1 | * | 5/2021 | Bruni ..................... F01D 5/145 |
| 2021/0394134 | A1 | * | 12/2021 | Miura .................. B01F 25/312 |
| 2022/0074347 | A1 | * | 3/2022 | Tada ......................... F23R 3/46 |
| 2023/0022725 | A1 | * | 1/2023 | Fukuba .................. F23D 14/78 |
| 2025/0025816 | A1 | * | 1/2025 | O'Neill ................. B01D 45/14 |
| 2025/0135724 | A1 | * | 5/2025 | Stapleton ............. B29C 64/393 |

FOREIGN PATENT DOCUMENTS

| | | |
|---|---|---|
| JP | 2014-126239 | 7/2014 |
| JP | 2017-186950 | 10/2017 |
| JP | 2021-055644 | 4/2021 |

OTHER PUBLICATIONS

International Preliminary Report on Patentability issued Oct. 10, 2023 in International Application No. PCT/JP2023/005867, with English translation.

* cited by examiner

COMBUSTOR AND GAS TURBINE

TECHNICAL FIELD

The present disclosure relates to a combustor and a gas turbine.

Priority is claimed on Japanese Patent Application No. 2022-56000, filed Mar. 30, 2022, the content of which is incorporated herein by reference.

BACKGROUND ART

For example, Patent Document 1 discloses a cluster combustor as an example of a combustor used for a gas turbine.

The above cluster combustor includes main nozzles (first nozzles) that are provided in parallel with each other and inject a premixed gas of air and fuel, and a pilot nozzle (second nozzle) generates a pilot flame for flame holding. A plurality of the main nozzles are collectively disposed to configure a nozzle segment. The nozzle segment is disposed in an annular shape, and the pilot nozzle is provided at the center of the annular shape. The pilot flame by the pilot nozzle ensures the flame holding property of the main flame by each main nozzle.

CITATION LIST

Patent Document

Patent Document 1: United States Patent Application, Publication No. 2014/0116054

SUMMARY OF INVENTION

Technical Problem

However, in the combustor as described above, the flame holding property may deteriorate depending on the fuel or the operating state.

In addition, in order to secure the flame holding property, there is a problem in that the performance of the combustor deteriorates as a result of erosion of the installation area of the main nozzles by simply increasing the diameter of the pilot nozzle.

The present disclosure has been made to solve the above-described problems, and an object of the present disclosure is to provide a combustor and a gas turbine capable of improving flame holding property while maintaining the performance of the combustor.

Solution to Problem

In order to achieve the above object, a combustor according to an aspect of the present disclosure includes a combustor plate configured to have a downstream end face perpendicular to a combustor axis; a nozzle segment configured such that a plurality of first nozzles that inject a premixed gas of air and fuel from a side of the downstream end face are collectively disposed; and a plurality of second nozzles configured to inject the fuel from the downstream end face. A plurality of the nozzle segments are provided at intervals in a direction perpendicular to the combustor axis. Each of the second nozzles injects the fuel from a dividing region between the nozzle segments on the downstream end face.

A gas turbine according to the present disclosure includes a compressor configured to generate air; the combustor configured to generate a combustion gas by combusting a premixed gas generated by mixing fuel with the air compressed by the compressor; and a turbine configured to be driven by the combustion gas.

Advantageous Effects of Invention

According to the combustor and the gas turbine of the present disclosure, it is possible to improve the flame holding property while maintaining the performance of the combustor.

DESCRIPTION OF EMBODIMENTS

First Embodiment

A first embodiment of the present invention will be described in detail below with reference to FIGS. 1 to 4.

Figure 1:
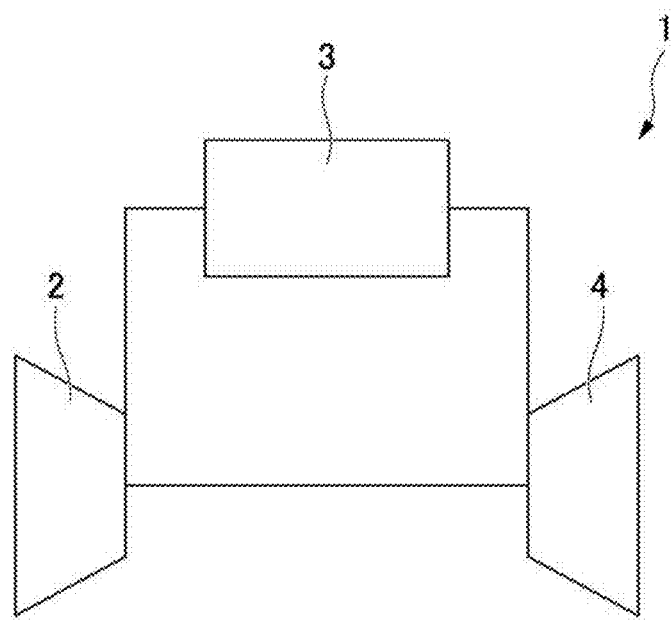
FIG. 1 is a schematic diagram showing a schematic configuration of a gas turbine according to a first embodiment of the present disclosure.

As shown in FIG. 1, a gas turbine 1 according to the present embodiment has a compressor 2 that compresses air A, a combustor 3 that generates combustion gas C, and a turbine 4 that is driven by the combustion gas C.

A plurality of the combustors 3 are provided around the rotation axis of the gas turbine 1 at intervals in a circumferential direction. The combustor 3 mixes and combusts fuel with the air A compressed by the compressor 2 to generate a high-temperature and high-pressure combustion gas C.

<Combustor>

Hereinafter, the configuration of the combustor 3 will be described with reference to FIGS. 2 to 4.

Figure 2:
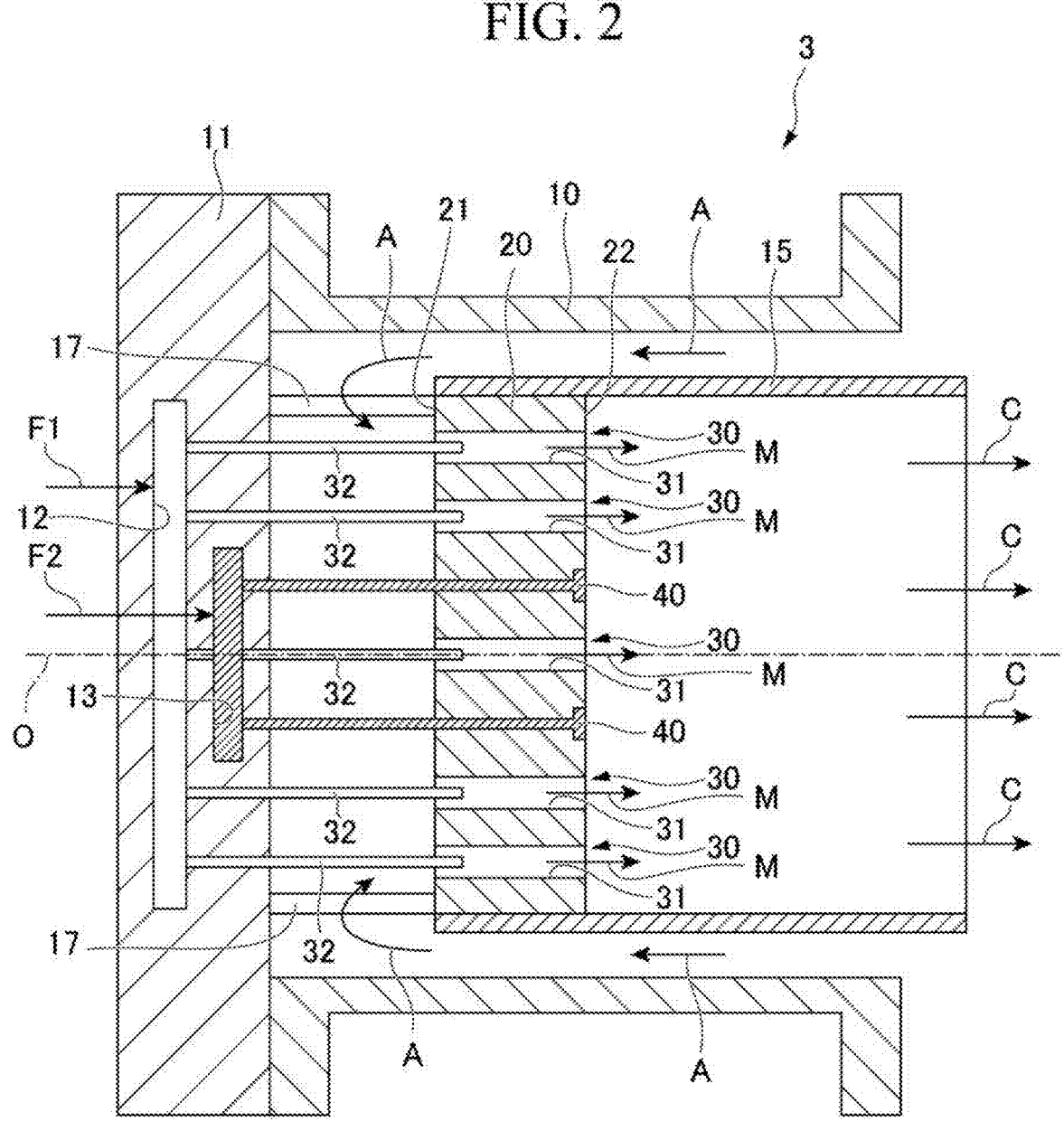
FIG. 2 is a longitudinal sectional view showing a schematic configuration of a combustor according to the first embodiment of the present disclosure.

As shown in FIG. 2, the combustor 3 includes an outer cylinder 10, an end cover 11, an inner cylinder 15, a support portion 17, a combustor plate 20, a main nozzle 30 as a first nozzle, and a pilot nozzle 40 as a second nozzle.

<Outer Cylinder>

The outer cylinder 10 has a cylindrical shape centered on a combustor axis O (hereinafter, simply referred to as an axis O) that is the center of the combustor 3.

<End Cover>

The end cover 11 has a disk shape that closes the end portion of the outer cylinder 10 on one side (left side in FIG. 2) in the direction of the axis O. An end portion of the outer cylinder 10 on one side in the direction of the axis O is in contact with the end cover 11. A first fuel header 12 and a second fuel header 13 as a space are formed inside the end cover 11. A main fuel F1 as a first fuel is supplied from an outside to the first fuel header 12. A pilot fuel F2 as a second fuel is supplied from an outside to the second fuel header 13. As the main fuel F1 and the pilot fuel F2, for example, hydrogen, natural gas, or a mixed fuel obtained by mixing these is used.

<Inner Cylinder>

The inner cylinder 15 is coaxially disposed inside the outer cylinder 10. The inner cylinder 15 has a cylindrical shape extending inside the outer cylinder 10 in the direction of the axis O. An end portion of the inner cylinder 15 on one side in the direction of the axis O is spaced apart from the end cover 11 in the direction of the axis O. An outer diameter of the inner cylinder 15 is smaller than an inner diameter of the outer cylinder 10. Accordingly, an annular flow passage is formed between an outer peripheral surface of the inner cylinder 15 and an inner peripheral surface of the outer cylinder 10. The air A compressed by the compressor 2 flows in the flow passage from the other side (right side in FIG. 2) in the direction of the axis O to one side in the direction of the axis O.

<Support Portion>

A plurality of the support portions 17, which are members extending in the direction of the axis O, are provided at intervals in the circumferential direction. An end portion of each support portion 17 on one side in the direction of the axis O is fixed to a surface of the end cover 11 facing the other side in the direction of the axis O on the inner peripheral side of the outer cylinder 10. The air A, which has flowed to one side in the direction of the axis O between the outer cylinder 10 and the inner cylinder 15, reverses the flow direction thereof to the other side in the direction of the axis O when the air A flows between the support portions 17 adjacent to each other.

<Combustor Plate>

The combustor plate 20 has a disk shape centered on the axis O. The combustor plate 20 is provided to be fitted coaxially inside the inner cylinder 15. The combustor plate 20 has an upstream end face 21 and a downstream end face 22.

<Upstream End Face>

The upstream end face 21 is an end face of the combustor plate 20 facing one side in the direction of the axis O and has a planar shape perpendicular to the axis O. The upstream end face 21 is disposed at the same position in the direction of the axis O as an end face of the inner cylinder 15 on one side in the direction of the axis O.

<Downstream End Face>

The downstream end face 22 is an end face of the combustor plate 20 facing the other side in the direction of the axis O and has a planar shape perpendicular to the axis O. The downstream end face 22 is located on one side in the direction of the axis O with respect to an end face of the inner cylinder 15 on the other side in the direction of the axis O. Accordingly, a space is defined by the inner peripheral surface of the inner cylinder 15 and the downstream end face 22 of the combustor plate 20. The space is a combustion space of the combustor 3.

<Main Nozzle>

Figure 3:
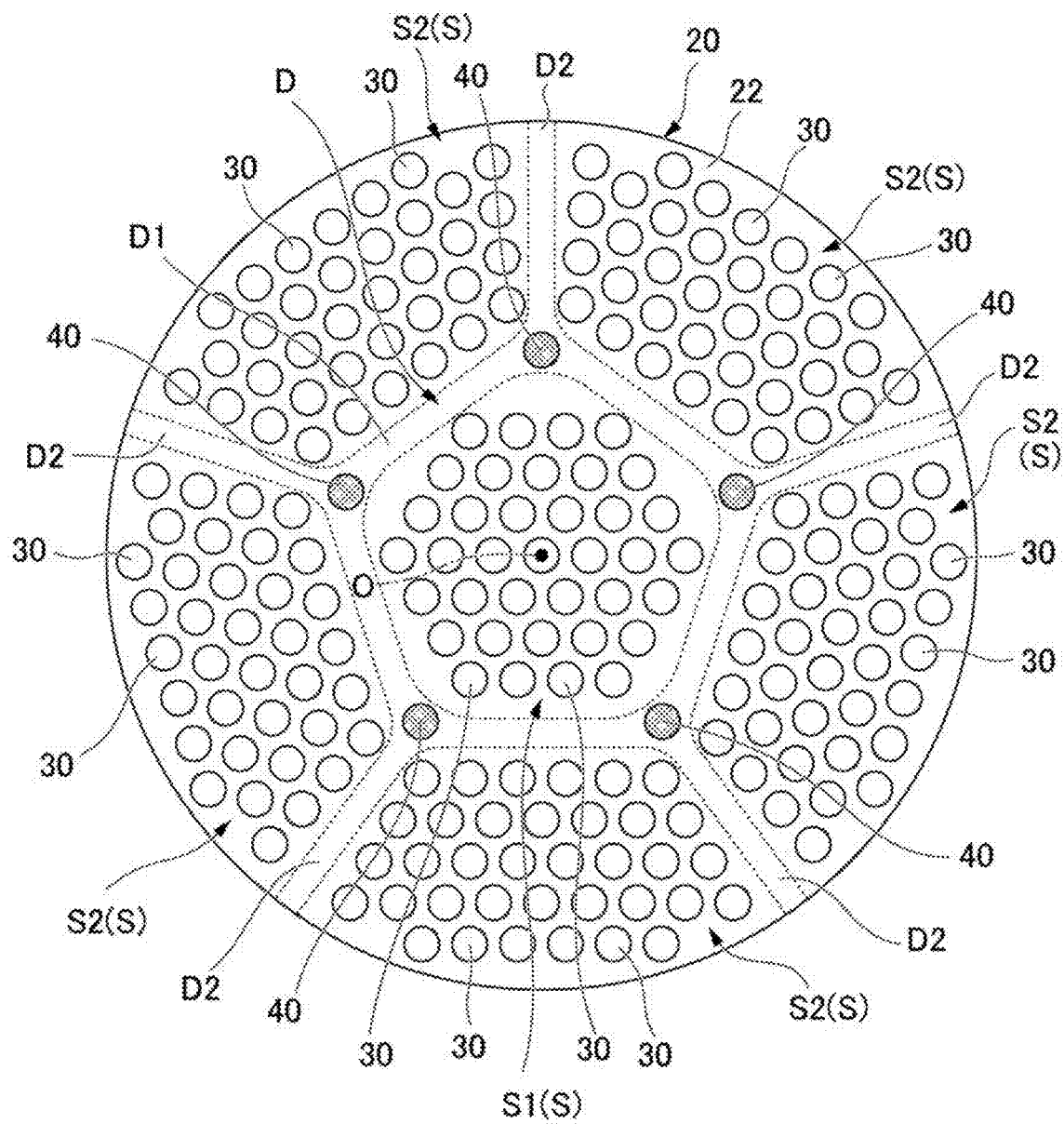
FIG. 3 is a view of a downstream end face of a combustor plate of the combustor according to the first embodiment of the present disclosure as viewed from a downstream side.

As shown in FIGS. 2 and 3, the main nozzle 30 forms a main flame F by injecting the premixed gas M of the air A and the main fuel F1 to the downstream side (the other side in the direction of the axis O, the right side in FIG. 2) from the downstream end face 22 of the combustor plate 20.

A plurality of the main nozzles 30 are provided, and each main nozzle 30 is configured with a mixing tube 31 and a fuel supply pipe 32.

The mixing tube 31 is a pipe extending in the direction of the axis O and the air A flows into the mixing tube 31 from the upstream side (one side in the direction of the axis O, left side in FIG. 2). The mixing tube 31 of the present embodiment is formed as a hole portion that extends in the direction of the axis O to penetrate the upstream end face 21 and the downstream end face 22 of the combustor plate 20. The mixing tube 31 extends in a straight line in the direction of the axis O and has a uniform inner diameter in the direction of the axis O. An inner side of the mixing tube 31 is a flow passage in which one side in the direction of the axis O is an upstream side and the other side in the direction of the axis O is a downstream side. A plurality of the mixing tubes 31 are provided in parallel at intervals in a direction perpendicular to the axis O.

A plurality of fuel supply pipes 32 are provided in a one-to-one relationship to correspond to the respective mixing tubes 31. The fuel supply pipe 32 supplies the main fuel F1 into the mixing tube 31. The main fuel F1 supplied into the mixing tube 31 and the air A flowing in the mixing tube 31 are mixed with each other to generate the premixed gas M. An opening portion (opening portion of the main nozzle 30) of the mixing tube 31 of the downstream end face 22 of the combustor plate 20 is an injecting port for the premixed gas M.

The fuel supply pipe 32 is a tubular member extending in the direction of the axis O and has an end portion on one side in the direction of the axis O fixed to the end cover 11. The fuel supply pipe 32 communicates with the first fuel header 12 in the end cover 11 on one side in the direction of the axis O. The main fuel F1 is introduced from the first fuel header 12 into the fuel supply pipe 32. An end portion of the fuel supply pipe 32 on the other side in the direction of the axis O is inserted from the upstream end face 21 side of the combustor plate 20 in the mixing tube 31. That is, the tip of the fuel supply pipe 32 capable of injecting the fuel is located in the mixing tube 31.

<Pilot Nozzle>

The pilot nozzle 40 injects the pilot fuel F2 from the downstream end face 22.

The pilot nozzle 40 is a tubular member extending in the direction of the axis O and has an end portion on one side in the direction of the axis O fixed to the end cover 11. The pilot nozzle 40 communicates with the second fuel header 13 in the end cover 11 on one side in the direction of the axis O. The pilot fuel F2 is introduced into the pilot nozzle 40 from the second fuel header 13.

The pilot nozzle 40 has a portion on the other side in the direction of the axis O penetrating the combustor plate 20 over the upstream end face 21 and the downstream end face 22. The tip of the pilot nozzle 40, which is the end portion on the other side in the direction of the axis O, is located at the same position in the direction of the axis O as the downstream end face 22. This allows the pilot nozzle 40 to inject the fuel from the downstream end face 22 of the combustor plate 20. A plurality of the pilot nozzles 40 are provided at intervals in a direction perpendicular to the axis O.

<Nozzle Segment>

In the present embodiment, as shown in FIG. 3, the plurality of main nozzles 30 are collectively disposed to form a nozzle segment S. The nozzle segment S is a bundle formed by collectively disposing a plurality of main nozzles 30. In a case where the downstream end face 22 of the combustor plate 20 is viewed from the downstream side, the nozzle segment S is capable of being identified as a region where openings of the main nozzles 30 are collected.

In the present embodiment, the plurality of nozzle segments S are provided at intervals in a direction perpendicular to the axis O. In each nozzle segment S, the interval between the main nozzles 30 adjacent to each other is dense. The interval between the nozzle segments S is larger than the interval between the adjacent main nozzles 30 in each nozzle segment S. A region between the nozzle segments S that form the interval between the nozzle segments S is set as a dividing region D. The dividing region D extends in a strip shape or a linear shape in a direction perpendicular to the axis O along the downstream end face 22 to divide the adjacent nozzle segments S from each other. As described above, the width (the dimension on the downstream end face 22 perpendicular to an extension direction of the dividing region D) of the dividing region D is larger than the interval between the main nozzles 30 in each segment. For this reason, in a case where the downstream end face 22 is viewed, the dividing region D is capable of being easily visually recognized.

Here, in the present embodiment, the nozzle segments S have a central segment S1 and an outer-peripheral-side segment S2.

The central segment S1 is formed by the main nozzles 30 that are collectively disposed at a central portion of the combustor plate 20 including the axis O. That is, the central segment S1 is disposed at the center of the combustor plate 20.

The outer-peripheral-side segment S2 is formed by the main nozzles 30 that are collectively disposed on the radially outer side of the central segment S1 in the combustor plate 20. A plurality of (five in the present embodiment) the outer-peripheral-side segments S2 are disposed at intervals via the dividing regions D on the radially outer side of the central segment S1. A plurality of the outer-peripheral-side segments S2 are provided at intervals in the circumferential direction. The outer-peripheral-side segments S2 adjacent to each other are disposed at an interval via each dividing region D.

A region that divides the central segment S1 and the outer-peripheral-side segments S2 in the dividing region D is set as an annular region D1. The annular region D1 extends in an annular shape to surround the axis O.

A region that divides the outer-peripheral-side segments S2 adjacent to each other in the dividing region D is set as a radial region D2. A plurality (five in the present embodiment) of the radial regions D2 are radially provided to extend in the radial direction of the axis O. An end portion of each radial region D2 on the radially inner side is connected to the annular region D1. An end portion of each radial region D2 on the radially outer side is connected to an outer peripheral edge portion of the combustor plate 20.

<Disposition of Second Nozzle>

As shown in FIG. 3, the plurality of pilot nozzles 40 as the second nozzles are dispersedly disposed such that the pilot fuel F2 is injected from the dividing region D on the downstream end face 22. That is, each pilot nozzle 40 is provided to penetrate a region between the adjacent nozzle segments S in the combustor plate 20. The tip of the pilot nozzle 40 that injects the pilot fuel F2 is located in the dividing region D.

In the present embodiment, the pilot nozzle 40 injects the fuel from a connection point between a circumferential region and each radial region D2 in the dividing region D. That is, the tips of the pilot nozzles 40 that inject the pilot fuel F2 are dispersedly disposed at the plurality of connection points.

<Effects>

Next, the operation and effects of the combustor 3 according to the present embodiment will be described.

As shown in FIG. 2, during the operation of the gas turbine 1, the air A enters each of the mixing tubes 31 of the main nozzles 30 from the upstream side, and the air A flows in the mixing tube 31 toward the downstream side. In a case where the main fuel F1 is supplied into the mixing tube 31 from the tip of the fuel supply pipe 32 in this state, the air A and the main fuel F1 are mixed in the mixing tube 31 to generate the premixed gas M. The premixed gas M is injected from an opening of the mixing tube 31, that is, the opening of the main nozzle 30, on the downstream end face 22 of the combustor plate 20.

Figure 4:
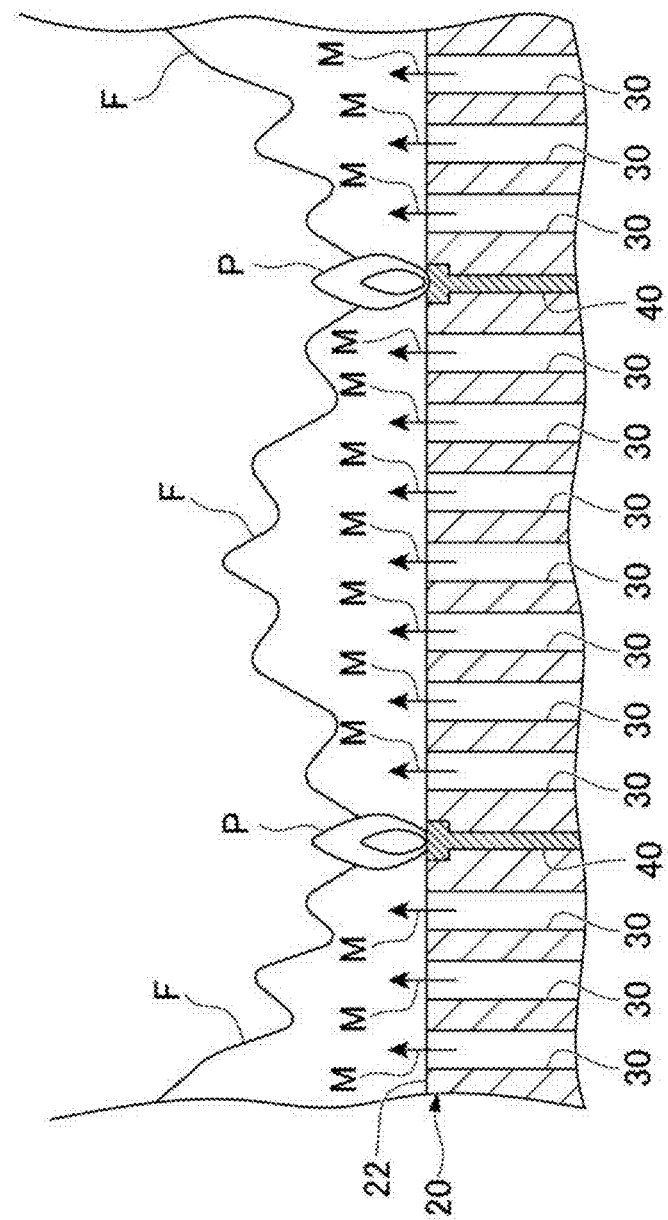
FIG. 4 is a longitudinal sectional view of a main portion of the combustor plate of the combustor according to the first embodiment of the present disclosure.

On the other hand, as shown in FIG. 4, in a case where the pilot fuel F2 is injected from the tip of the pilot nozzle 40 on the downstream end face 22, the pilot flame P as a diffusion flame is generated by ignition of the pilot fuel F2. As the premixed gas M injected from the main nozzle 30 is combusted with the pilot flame P as a starting point, the main flame F as a premixed flame is generated. Then, the pilot flame P of the pilot nozzle 40 ensures the flame holding property of the main flame F, thereby allowing a stable combustion reaction. The combustion gas C generated by such combustion is sent to the turbine 4.

Here, in the present embodiment, the plurality of pilot nozzles 40 are dispersedly disposed in the dividing region D. For this reason, it is possible to ensure the flame holding of all the plurality of main nozzles 30 while reducing the size of the pilot flame P by the pilot nozzles 40. In addition, as the size of the pilot flame P is reduced, the flame length of the main flame F is shortened, and the burnout is improved. As a result, the generation of unburned components of the fuel is capable of being suppressed. As a result, it is possible to ensure the flame holding property of the entire combustor 3.

In addition, by dispersedly disposing small-sized pilot nozzles 40 in the dividing region D instead of increasing the size of one pilot nozzle 40, it is possible to avoid the erosion of the installation area of the main nozzles 30.

In a case where the diameter of the pilot nozzle 40 is increased, resulting in a reduction in the installation area of the main nozzles 30, the number of mixing tubes 31 is also reduced accordingly. In this case, as a result of an increase in pressure loss of the air A, the performance of the combustor 3 deteriorates.

In the present embodiment, by dispersedly disposing the plurality of pilot nozzles 40 in the dividing region D where no main nozzle 30 is originally disposed, the installation space of the main nozzles 30 is capable of being secured as before. For this reason, the performance of the combustor 3 is capable of being maintained.

Moreover, in the present embodiment, since the pilot nozzle 40 is configured to inject the fuel from the connection point between the annular region D1 and the radial region D2 in the dividing region D, the flame holding properties of the three nozzle segments S in contact with the connection point is capable of being ensured by the pilot flame P of the pilot nozzle 40. That is, since one pilot nozzle 40 is capable of securing the flame holding property of a large number of the nozzle segments S, it is possible to effectively use the installation space.

Second Embodiment

Figure 5:
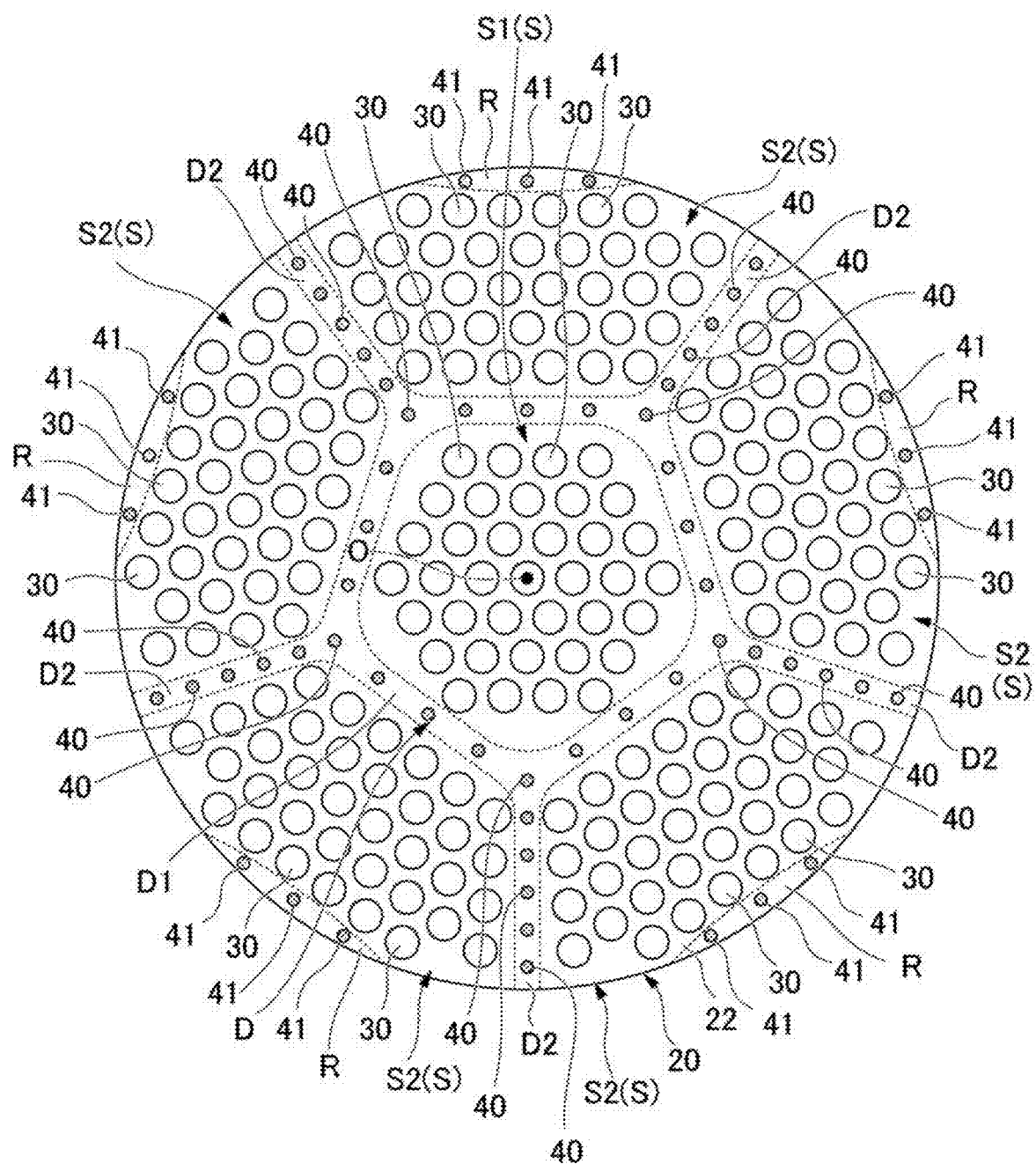
FIG. 5 is a view of the downstream end face of the combustor plate of a combustor of a second embodiment according to the present disclosure as viewed from the downstream side.

Next, a second embodiment of the present invention will be described with reference to FIG. 5. In the second embodiment, the same components as those of the first embodiment are denoted by the same reference numerals and the detailed description thereof will be omitted.

In the second embodiment, the disposition points of the pilot nozzles 40 are different from those in the first embodiment.

That is, in the second embodiment, a large number of the pilot nozzles 40 are provided at intervals in the extension direction of the annular region D1 of the dividing region D. That is, the pilot nozzle 40 is provided not only at the connection point between the annular region D1 and each radial region D2 but also a plurality of (three connection points in the present embodiment) the pilot nozzles 40 are provided at a portion between the adjacent connection points in the annular region D1.

Moreover, a plurality of the pilot nozzles 40 are provided at intervals in the extension direction of the radial region D2 in the radial region D2 of the dividing region D.

In addition, in the present embodiment, an outer-peripheral-side region R on the radially outer side of the outer-peripheral-side segment S2 on the downstream end face 22 of the combustor plate 20 is also provided with an outer-peripheral-side pilot nozzle 41 serving as a third nozzle that injects the pilot fuel F2. The outer-peripheral-side region R is a dead space between the outer-peripheral-side segment S2 and the outer peripheral edge portion of the combustor plate 20. A plurality of the outer-peripheral-side pilot nozzles 41 are provided at intervals in the circumferential direction in the outer peripheral edge portion.

In the second embodiment, since a large number of the pilot nozzles 40 are dispersedly disposed in a mesh shape over the entire dividing region D, the flame holding region in all the plurality of nozzle segments S is capable of being expanded. For this reason, the flame length of the main flame F is capable of being further shortened, and the generation of unburned components is capable of being suppressed.

Moreover, by installing the outer-peripheral-side pilot nozzles 41 in the dead space such as the further outer peripheral side of the outer-peripheral side segment S2 as well as the dividing region D, the flame holding property as the entire nozzle segment S is capable of being further improved while maintaining the performance of the combustor 3.

Figure 6:
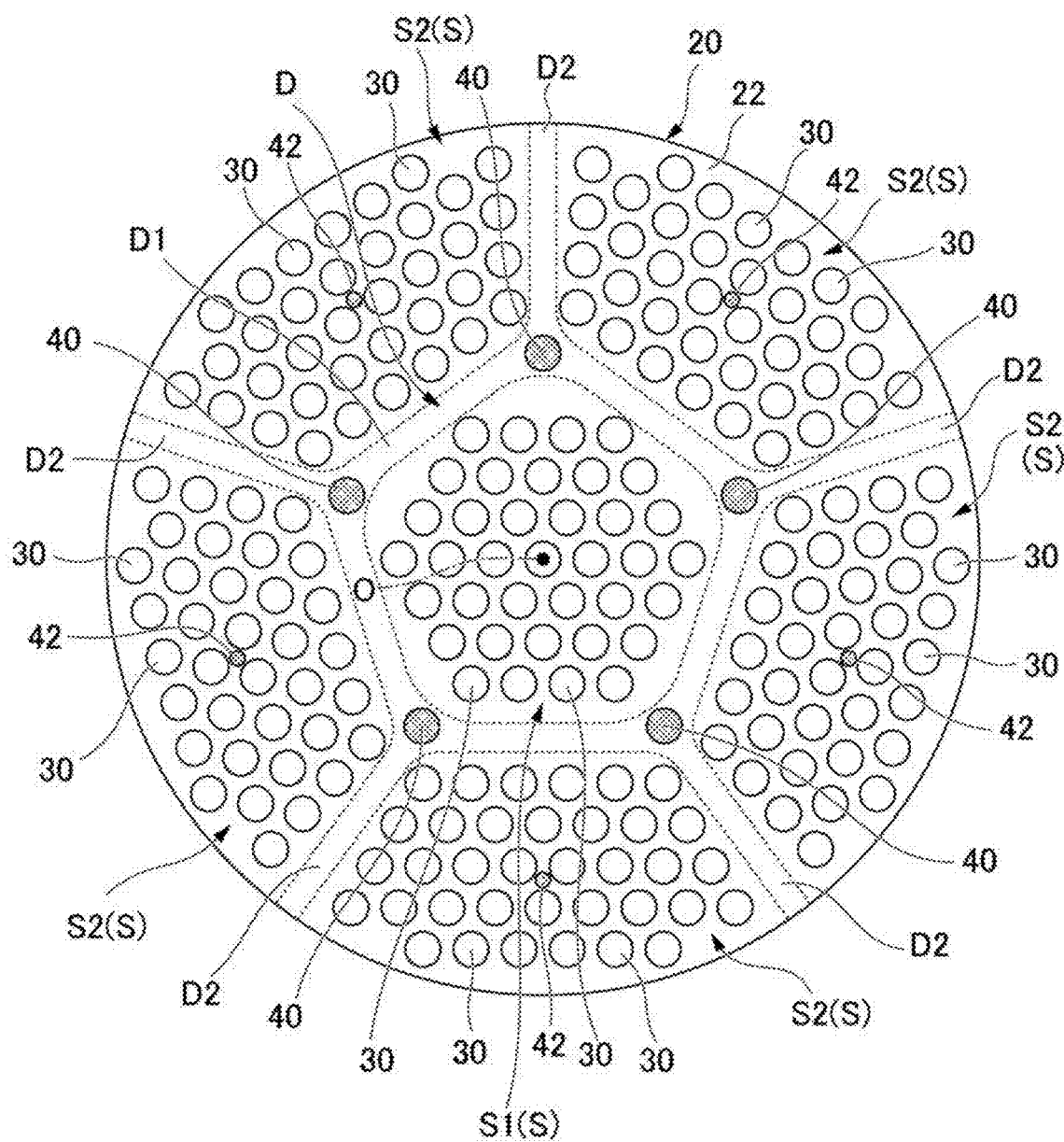
FIG. 6 is a view of the downstream end face of the combustor plate of a combustor according to a third embodiment of the present disclosure as viewed from the downstream side.

Next, a third embodiment of the present invention will be described with reference to FIG. 6. In the third embodiment, the same components as those of the first embodiment are denoted by the same reference numerals and the detailed description thereof will be omitted.

In the third embodiment, inner pilot nozzles 42 as fourth nozzles are disposed in a region in the nozzle segment S.

That is, the inner pilot nozzles 42 are disposed to inject fuel from an inner region of the outer-peripheral-side segment S2 in the nozzle segment S.

In the present embodiment, since the plurality of pilot nozzles 40 are dispersedly disposed in the dividing region D, the diameter of the inner pilot nozzles 42 to be installed in the nozzle segment S is capable of being reduced. For this reason, it is possible to secure the flame holding property of the main nozzles 30 inside the nozzle segment S without significantly eroding the installation area of the main nozzles 30. That is, it is possible to ensure the flame holding property of the main nozzles 30 particularly at positions far from the dividing region D and to shorten the flame length of the main flame F to further reduce the generation of unburned components.

Figure 7:
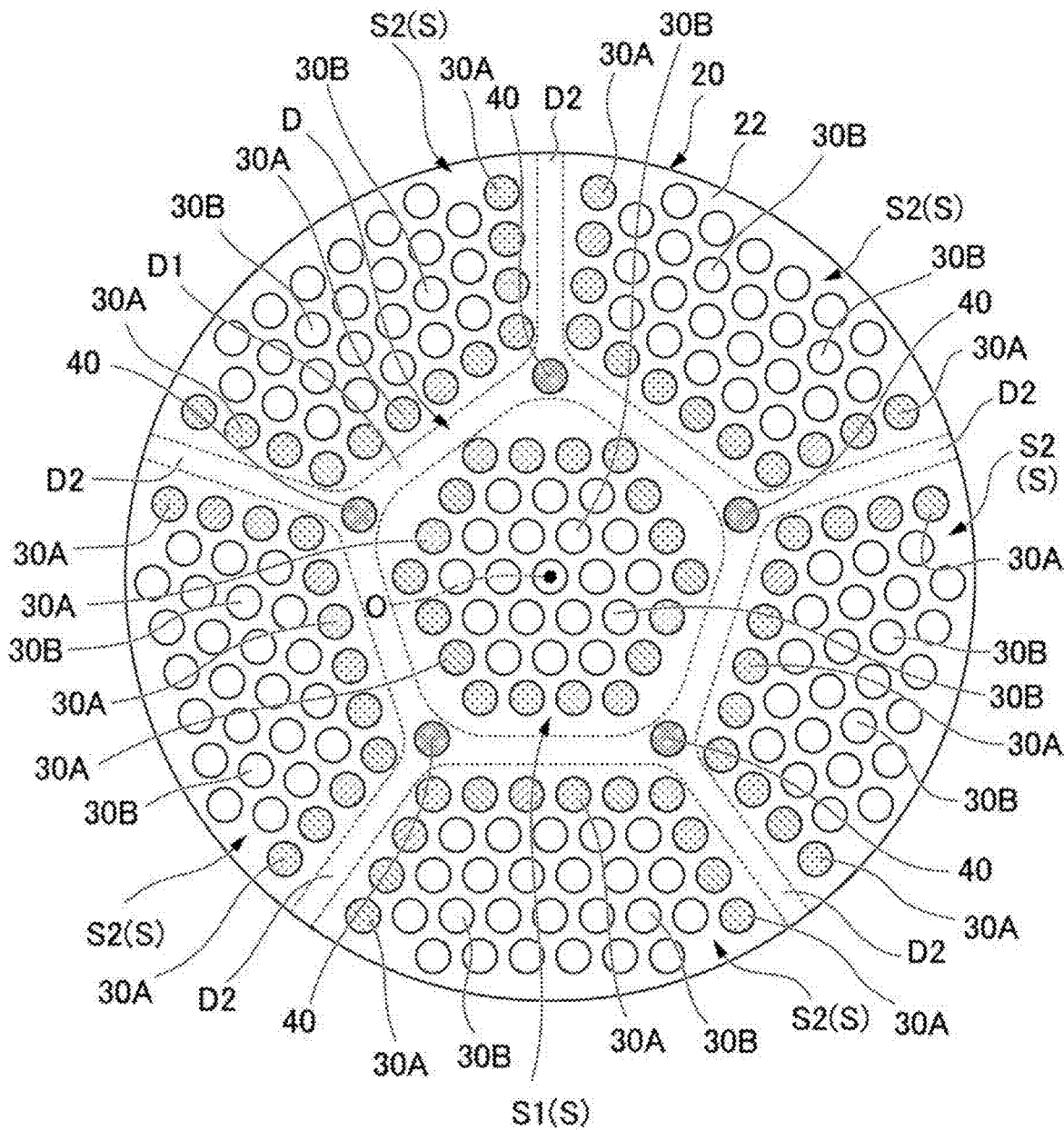
FIG. 7 is a view of the downstream end face of the combustor plate of a combustor of a fourth embodiment according to the present disclosure as viewed from the downstream side.
Figure 8:
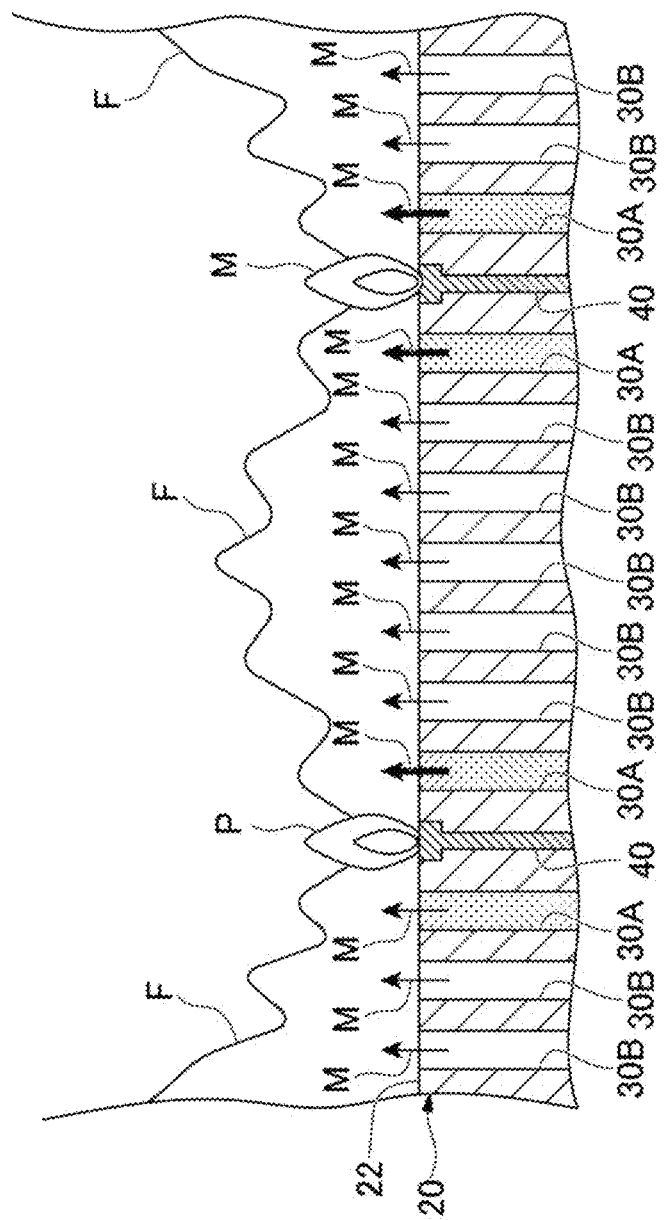
FIG. 8 is a longitudinal sectional view of a main portion of a combustor plate of the combustor according to the fourth embodiment of the present disclosure.

Next, a fourth embodiment of the present invention will be described with reference to FIGS. 7 and 8. In the fourth embodiment, the same components as those of the third embodiment are denoted by the same reference numerals and the detailed description thereof will be omitted.

In the fourth embodiment, the fuel concentrations in the main nozzles 30 of each nozzle segment S are made different from each other.

Here, among the main nozzles 30 of each nozzle segment S, the main nozzles 30 disposed adjacent to the dividing region D are defined as outer nozzles 30A, and the main nozzles 30 (the main nozzle 30 not adjacent to the dividing region D) disposed inside the nozzle segment S with respect to the outer nozzles 30A are defined as inner nozzles 30B.

In the present embodiment, the fuel concentration of the premixed gas M injected from each outer nozzle 30A is set to be higher than the fuel concentration of the premixed gas M injected from each inner nozzle 30B. Such setting of the fuel concentration is capable of being realized, for example, by appropriately providing orifices in the first fuel header 12 to adjust the flow rate of the main fuel F1 supplied to each fuel supply pipe 32. Alternatively, the fuel concentration may be appropriately set by providing orifices in the fuel supply pipe 32 or changing the diameter of the fuel supply pipe 32.

With such a configuration, the combustion reaction of the main flame F of the outer nozzle 30A adjacent to the dividing region D is promoted. For this reason, the main flame F having the pilot flame P of the pilot nozzle 40 disposed in the dividing region D as a starting point is allowed to transition to the upstream side. As a result, the flame length of the main flame F is capable of being shortened, and the generation of unburned components is capable of being further suppressed.

Other Embodiment

Hitherto, the embodiments according to the present invention have been described. However, the present invention is not limited thereto and is capable of being appropriately modified within the scope without departing from the technical idea of the invention.

For example, the configuration in which the mixing tube 31 and the fuel supply pipe 32 are provided has been described as the main nozzle 30, but a configuration in which the main fuel F1 is injected from an inner peripheral surface of the mixing tube 31 instead of the fuel supply pipe 32 may be adopted.

Figure 9:
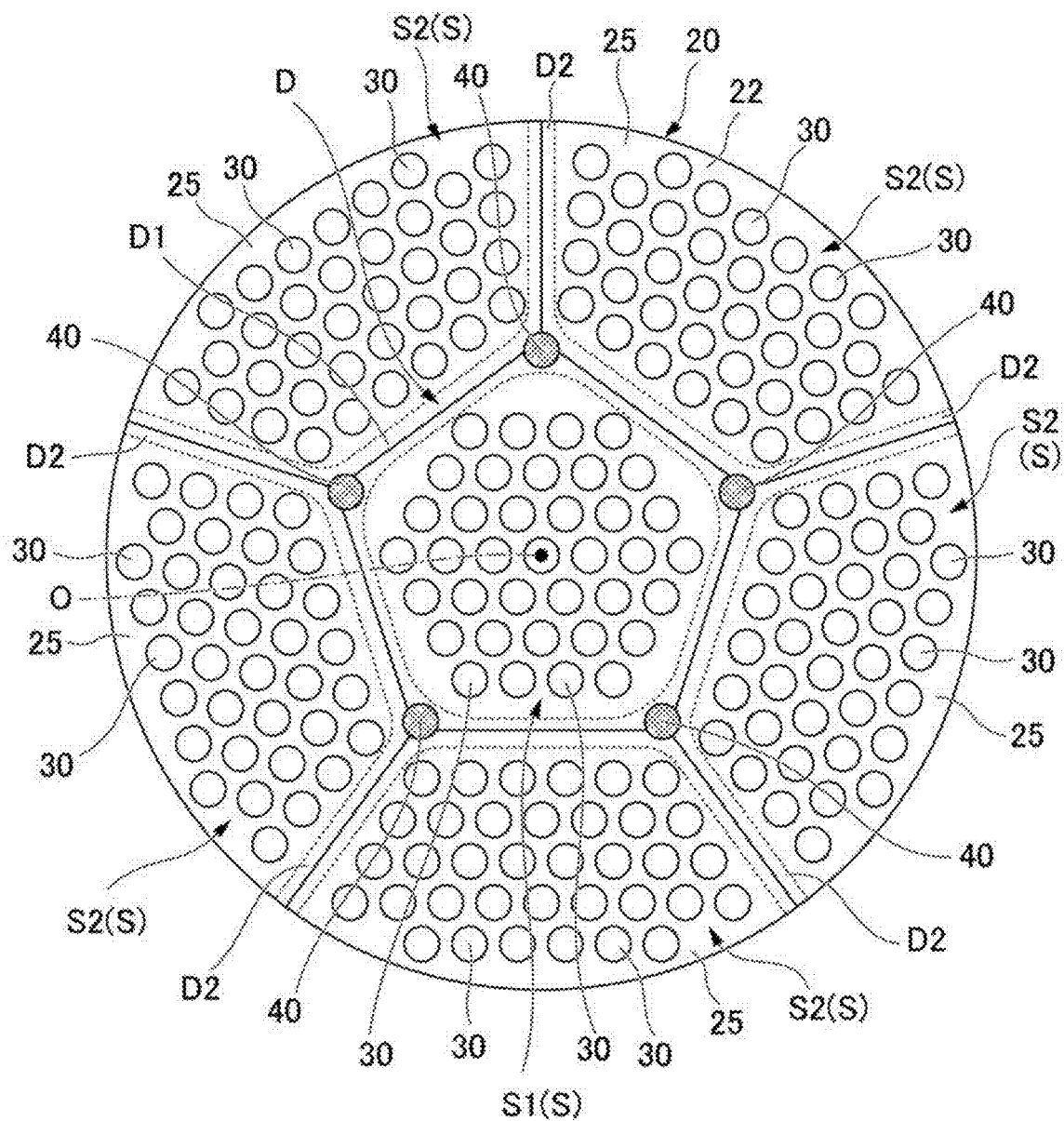
FIG. 9 is a view showing a modification example of the combustor plate of the combustors according to the embodiments of the present disclosure.

Here, for example, as in a modification example shown in FIG. 9, the combustor plate 20 of each embodiment may be configured with a plurality of divided bodies 25 divided as viewed from the direction of the axis O. A boundary between the respective divided bodies 25 is a dividing line. The dividing region D in which the nozzle segment S is provided in each divided body 25 is a region including a dividing line between the divided bodies 25. For this reason, the pilot nozzles 40 are disposed on the dividing line to be sandwiched between the adjacent divided bodies 25. By disposing the pilot nozzles 40 between dividing lines between the divided bodies 25 in this way, the combustor 3 is capable of being easily assembled. In addition, since it is easy to change a fuel system for each nozzle segment S, it is possible to improve the degree of freedom of a combustion mode.

For example, in the first embodiment, although an example in which the pilot nozzles 40 are disposed at all the connection points between the annular region D1 and the radial regions D2 in the dividing region D has been described, the present disclosure is not limited thereto. The pilot nozzles 40 may be disposed only at some of the plurality of connection points.

For example, in the second embodiment, the example has been described in which the plurality of pilot nozzles 40 are installed in both of the annular region D1 and the radial regions D2 in the dividing region D, but the present disclosure is not limited thereto. For example, a configuration may be adopted in which the pilot nozzles 40 are installed in at least one of the annular region D1 or the radial regions D2. That is, the pilot nozzles 40 may be dispersedly disposed in at least one of the annular region D1 or the radial regions D2.

In the third embodiment, the inner pilot nozzles 42 as the fourth nozzles are provided only in the outer-peripheral-side segment S2, but the inner pilot nozzles 42 may be provided in a region in the central segment S1. In addition, the inner pilot nozzles 42 may be provided only in the region in the central segment St without providing the inner pilot nozzles 42 in the region in the outer-peripheral-side segment S2.

In the fourth embodiment, the fuel concentration of the outer nozzles 30A is set to be higher than the fuel concentration of the inner nozzles 30B, but the present disclosure is not limited thereto. For example, the main fuel F1 of each outer nozzle 30A and the main fuel F1 of each inner nozzle 30B may be different types of fuel, and a fuel that is more easily combusted than the main fuel F1 of the inner nozzle 30B may be adopted as the main fuel F1 of the outer nozzle 30A. For example, the ratio of hydrogen in the fuel in the outer nozzle 30A may be increased relative to the fuel in the inner nozzle 30B. Accordingly, since the combustion reaction of the main flame F of the outer nozzle 30A is also promoted, the same effects as those of the fourth embodiment are capable of being obtained.

In addition, the pilot fuel F2 of the pilot nozzle 40 may be configured to be a type of fuel that is more easily combusted to further secure the flame holding property.

Appendix

The combustor 3 and the gas turbine 1 described in each embodiment can be understood as follows.

(1) A combustor 3 according to a first aspect includes a combustor plate 20 configured to have a downstream end face 22 perpendicular to a combustor axis O; a nozzle segment S configured such that a plurality of first nozzles 30 that inject a premixed gas M of air A and fuel from the downstream end face 22 side are collectively disposed; and a plurality of second nozzles 40 configured to inject the fuel from the downstream end face 22, in which a plurality of the nozzle segments S are provided at intervals in a direction perpendicular to the combustor axis O and each of the second nozzles 40 injects the fuel from a dividing region D between the nozzle segments S on the downstream end face 22.

With such a configuration, a premixed flame by each first nozzles 30 is formed with a diffusion flame of each second nozzle 40 as a starting point. In the present aspect, since the plurality of second nozzles 40 are dispersedly disposed in the dividing region D, the size of the diffusion flame is capable of being reduced, and the flame holding property is capable of being improved. In addition, since the second nozzles 40 are provided in a dead space between the nozzle segments S, the installation area of the first nozzles 30 is not eroded. For this reason, it is possible to avoid deterioration in the performance of the combustor 3.

(2) The combustor 3 according to a second aspect is the combustor 3 according to the first aspect, which may further include, as the nozzle segment S, a central segment S1 configured to be disposed in a central portion of the combustor plate 20 including the combustor axis O; and a plurality of outer-peripheral-side segments S2 configured to be disposed at intervals on a radially outer side of the combustor axis O in the central segment S1 and at intervals in a circumferential direction of the combustor axis O, in which the dividing region D may include an annular region D1 that is a region between the central segment S1 and the plurality of outer-peripheral-side segments S2 and extends in an annular shape surrounding the combustor axis O and a radial region D2 that is a region between the outer-peripheral-side segments S2 adjacent to each other and extends in a radial direction of the combustor axis O.

By dispersedly disposing the second nozzles 40 in the dividing region D having such an annular region D1 and a radial region D2, it is possible to maintain the performance of the combustor 3 while improving the flame holding property.

(3) The combustor 3 according to a third aspect is the combustor 3 according to the second aspect, in which the second nozzles 40 may inject the fuel from a connection point between the annular region D1 and the radial region D2 in the dividing region D.

Accordingly, the second nozzles 40 disposed at the connection point can ensure the flame holding property of the plurality of nozzle segments S adjacent to the connection point.

(4) The combustor 3 according to a fourth aspect may be the combustor 3 according to the second or third aspect, in which a plurality of the second nozzles 40 may be disposed along an extension direction of at least one of the annular region D1 and the radial region D2 of the dividing region D.

By disposing the plurality of second nozzles 40 along the extension direction of the dividing region D, the flame holding property of the first nozzles 30 is capable of being ensured over a wide range of the nozzle segment S.

(5) The combustor 3 according to a fifth aspect may be the combustor 3 according to any one of the second to fourth aspects, further including a third nozzle 41 configured to inject the fuel from an outer-peripheral-side region R on the radially outer side of the outer-peripheral-side segment S2 on the downstream end face 22.

By installing the third nozzle 41 in a dead space such as a further outer peripheral side of the outer-peripheral-side segment S2 as well as the dividing region D, the flame holding property as the entire nozzle segment S is capable of being further improved while maintaining the performance of the combustor 3.

(6) The combustor 3 according to a sixth aspect may be the combustor 3 according to any one of the second to fifth aspects, further including a fourth nozzle 42 configured to inject the fuel from a region in the nozzle segment S on the downstream end face 22.

Accordingly, the flame holding property of the first nozzles 30 away from the dividing region D is capable of being ensured.

(7) The combustor 3 according to a seventh aspect may be the combustor 3 according to any one of the first to sixth aspects, in which, among the plurality of first nozzles 30 of the nozzle segment S, fuel concentration of the first nozzles 30 adjacent to the dividing region D is higher than fuel concentration of the other first nozzles 30.

Accordingly, the combustion reaction of the premixed flame of the first nozzles 30 adjacent to the dividing region D is promoted. For this reason, the premixed flame having the diffusion flame of the second nozzles 40 disposed in the dividing region D as a starting point is transitioned to the upstream side, and the flame length is shortened. As a result, the generation of unburned components is suppressed, and the flame holding property is ensured.

(8) The combustor 3 according to an eighth aspect may be the combustor 3 according to any one of the first to seventh aspects, in which, among the plurality of first nozzles 30 of the nozzle segment S, the fuel of the first nozzles 30 disposed adjacent to the dividing region D is a type of fuel that is more easily combusted than the fuel of the other first nozzles 30.

Accordingly, similar to (7), the combustion reaction of the premixed flame of the first nozzles 30 adjacent to the dividing region D is promoted. As a result, the generation of unburned components is suppressed and the flame holding property is ensured.

(9) The combustor 3 according to a ninth aspect may be the combustor 3 according to any one of the first to eighth aspects, in which the combustor plate 20 is configured with a plurality of divided bodies 25 divided as viewed from a direction of the combustor 3 axis O, the nozzle segment S is provided in each of the divided bodies 25, and the dividing region D is a region including a dividing line between the divided bodies 25.

Since the second nozzles 40 are capable of being disposed between the dividing lines between the divided bodies 25, the combustor 3 is capable of being easily assembled. In addition, since it is easy to change a fuel system for each nozzle segment S, it is possible to improve the degree of freedom of a combustion mode.

(10) A gas turbine 1 according to a tenth aspect includes a compressor 2 configured to generate air A; the combustor 3 according to any one of the first to ninth aspects, configured to generate a combustion gas C by combusting a premixed gas M generated by mixing fuel with the air A compressed by the compressor 2; and a turbine 4 configured to be driven by the combustion gas C.

REFERENCE SIGNS LIST

1: Gas turbine
2: Compressor
3: Combustor
4: Turbine
10: Outer cylinder
11: End cover.
12: First fuel header
13: Second fuel header
15: Inner cylinder
17: Support portion
20: Combustor plate
21: Upstream end face
22: Downstream end face
25: Divided body
30: Main nozzle
30A: Outer nozzle
30B: Inner nozzle
31: Mixing tube
32: Fuel supply pipe
40: Pilot nozzle
41: Outer peripheral-side pilot nozzle
42: Inner pilot nozzle
S: Nozzle segment
S1: Central segment
S2: Outer-peripheral-side segment
D: Dividing region
D1: Annular region
D2: Radial region
R: Outer-peripheral-side region
F: Main flame
P: Pilot flame
F1: Main fuel
F2: Pilot fuel
A: Air
M: Premixed gas
C: Combustion gas
O: Axis

The invention claimed is:

1. A combustor comprising:
a combustor plate configured to have a downstream end face intersected to a combustor axis;
a nozzle segment configured such that a plurality of first nozzles inject a premixed gas of air and fuel from a side of the downstream end face to generate a premixed flame are collectively disposed; and
a plurality of second nozzles configured to inject the fuel from the downstream end face to generate a diffusion flame,
wherein a plurality of the nozzle segments are provided at intervals in a direction perpendicular to the combustor axis, and
an end portion of each of the second nozzles on the downstream end face side is formed between the plurality of nozzle segments and is located in a dividing region on the downstream end face interposed between the nozzle segments adjacent to each other such that the nozzle segments are disposed with an interval therebetween.

2. The combustor according to claim 1, further comprising:
as the nozzle segment,
a central segment configured to be disposed in a central portion of the combustor plate including the combustor axis; and
a plurality of outer-peripheral-side segments configured to be disposed at intervals on a radially outer side of the combustor axis in the central segment and at intervals in a circumferential direction of the combustor axis,
wherein the dividing region includes
an annular region that is a region between the central segment and the plurality of outer-peripheral-side segments and extends in an annular shape surrounding the combustor axis, and a radial region that is a region between the outer-peripheral-side segments adjacent to each other and extends in a radial direction of the combustor axis.

3. The combustor according to claim 2, wherein the second nozzles inject the fuel from a connection point between the annular region and the radial region in the dividing region.

4. The combustor according to claim 2, wherein a plurality of the second nozzles are disposed along an extension direction of at least one of the annular region and the radial region of the dividing region.

5. The combustor according to claim 2, further comprising:
a third nozzle configured to inject the fuel from an outer-peripheral-side region on the radially outer side of the outer-peripheral-side segment on the downstream end face.

6. The combustor according to claim 2, further comprising:
a fourth nozzle configured to inject the fuel from a region in the nozzle segment on the downstream end face.

7. The combustor according to claim 1, wherein, among the plurality of first nozzles of the nozzle segment, fuel concentration of the first nozzles disposed adjacent to the dividing region is higher than fuel concentration of the other first nozzles.

8. The combustor according to claim 1, wherein, among the plurality of first nozzles of the nozzle segment, the fuel of the first nozzles disposed adjacent to the dividing region is a type of fuel that is more easily combusted than the fuel of the other first nozzles.

9. The combustor according to claim 1, wherein the combustor plate is configured of a plurality of divided bodies divided as viewed from a direction of the combustor axis, the nozzle segment is provided in each of the divided bodies, and the dividing region is a region including a dividing line between the divided bodies.

10. A gas turbine comprising:
a compressor configured to generate air;
the combustor according to claim 2, configured to generate a combustion gas by combusting a premixed gas generated by mixing fuel with the air compressed by the compressor; and
a turbine configured to be driven by the combustion gas.

11. A combustor comprising:
a combustor plate configured to have a downstream end face intersected to a combustor axis;
a nozzle segment configured such that a plurality of first nozzles that inject a premixed gas of air and fuel from a side of the downstream end face are collectively disposed; and
a plurality of second nozzles configured to inject the fuel from the downstream end face,
wherein a plurality of the nozzle segments are provided at intervals in a direction perpendicular to the combustor axis,
the combustor plate is configured of a plurality of divided bodies divided as viewed from a direction of the combustor axis, the nozzle segment is provided in each of the divided bodies, and each of the second nozzles injects the fuel from a dividing region between the nozzle segments on the downstream end face, and
the dividing region is a region including a dividing line between the divided bodies.

* * * * *